United States Patent
Lee et al.

(10) Patent No.: US 10,110,388 B2
(45) Date of Patent: Oct. 23, 2018

(54) REMOTELY CONTROLLABLE ELECTRONIC DEVICE, NETWORK SYSTEM FOR CONTROLLING THE ELECTRONIC DEVICE AND REMOTE CONTROL METHOD THEREOF

(71) Applicant: SAMSUNG ELECTRONICS CO., LTD., Suwon-si (KR)

(72) Inventors: Jin Lee, Suwon-si (KR); Ki-hun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 115 days.

(21) Appl. No.: 14/741,953

(22) Filed: Jun. 17, 2015

(65) Prior Publication Data

US 2016/0056968 A1 Feb. 25, 2016

(30) Foreign Application Priority Data

Aug. 25, 2014 (KR) .................. 10-2014-0110671

(51) Int. Cl.
*H04L 12/12* (2006.01)
*H04L 12/28* (2006.01)
(Continued)

(52) U.S. Cl.
CPC .............. *H04L 12/12* (2013.01); *G06F 1/325* (2013.01); *G06F 1/3209* (2013.01); *G06F 1/3287* (2013.01); *H04L 12/28* (2013.01); *H04L 43/10* (2013.01); *H04L 67/125* (2013.01); *H04L 67/145* (2013.01); *H04L 69/16* (2013.01); *H04W 52/02* (2013.01); *H04W 84/02* (2013.01); *H04W 88/02* (2013.01); *H04W 88/085* (2013.01); *Y02D 10/171* (2018.01);
(Continued)

(58) Field of Classification Search
CPC ...... G06F 1/3209; G06F 1/325; G06F 1/3287; H04L 12/12; H04L 12/28; H04L 12/40039; H04L 43/10; H04L 67/125; H04L 67/145; H04L 69/16; H04W 52/02; H04W 84/02; H04W 88/02; H04W 88/085; Y02B 60/50
USPC ........................................... 370/338
See application file for complete search history.

(56) References Cited

U.S. PATENT DOCUMENTS

| 7,397,800 | B2 * | 7/2008 | Elzur | H04L 47/193 370/394 |
| 2001/0039593 | A1 * | 11/2001 | Hariu | H04L 12/462 709/249 |

(Continued)

OTHER PUBLICATIONS

Communication dated Jan. 27, 2016 issued by European Patent Office in counterpart European Patent Application No. 15181813.5.
(Continued)

*Primary Examiner* — Stephen J Clawson
(74) *Attorney, Agent, or Firm* — Sughrue Mion, PLLC

(57) ABSTRACT

An electronic device including: a processor configured to control the electronic device while the electronic device is turned-on and turn-off the electronic device in response to a turn-off command; a network interface card (NIC) configured to periodically exchange a keep awake message with an external server through a repeater while the processor is turned-off; and a power supply configured to supply power to the NIC while the electronic device is turned-off.

20 Claims, 8 Drawing Sheets

(51) Int. Cl.
*H04W 52/02* (2009.01)
*H04L 12/26* (2006.01)
*G06F 1/32* (2006.01)
*H04L 29/08* (2006.01)
*H04L 29/06* (2006.01)
*H04W 88/08* (2009.01)
*H04W 88/02* (2009.01)
*H04W 84/02* (2009.01)

(52) U.S. Cl.
CPC .......... *Y02D 70/00* (2018.01); *Y02D 70/1222* (2018.01); *Y02D 70/1242* (2018.01); *Y02D 70/1262* (2018.01); *Y02D 70/142* (2018.01); *Y02D 70/26* (2018.01)

(56) References Cited

U.S. PATENT DOCUMENTS

| | | | | |
|---|---|---|---|---|
| 2003/0014623 | A1* | 1/2003 | Freed | H04L 29/06 713/150 |
| 2004/0008693 | A1* | 1/2004 | Grove | H04L 47/10 370/395.52 |
| 2005/0086349 | A1* | 4/2005 | Subramaniyan | G06F 9/50 709/230 |
| 2008/0281966 | A1* | 11/2008 | Jennings, III | H04L 29/12339 709/225 |
| 2009/0205038 | A1* | 8/2009 | Kumar | H04L 29/12 726/11 |
| 2009/0252072 | A1* | 10/2009 | Lind | H04W 76/045 370/311 |
| 2010/0023788 | A1 | 1/2010 | Scott et al. | |
| 2010/0039971 | A1* | 2/2010 | Lor | H04W 52/0274 370/311 |
| 2012/0224476 | A1* | 9/2012 | Jin | H04L 5/0091 370/229 |
| 2013/0196706 | A1* | 8/2013 | Patel | H04W 4/10 455/518 |
| 2014/0198718 | A1* | 7/2014 | Billau | H04W 40/02 370/328 |
| 2014/0241158 | A1* | 8/2014 | Anthony, Jr. | H04W 28/0231 370/235 |
| 2016/0255539 | A1* | 9/2016 | Mizukoshi | H04W 36/0072 370/329 |
| 2018/0049095 | A1* | 2/2018 | Mishra | H04W 40/02 |

OTHER PUBLICATIONS

Communication dated Feb. 13, 2018, issued by the State Intellectual Property Office in counterpart Chinese application No. 201510527743.9.

* cited by examiner

REMOTELY CONTROLLABLE ELECTRONIC DEVICE, NETWORK SYSTEM FOR CONTROLLING THE ELECTRONIC DEVICE AND REMOTE CONTROL METHOD THEREOF

CROSS-REFERENCE TO RELATED APPLICATION

This application claims priority from Korean Patent Application No. 10-2014-0110671, filed on Aug. 25, 2014, in the Korean Intellectual Property Office, the disclosure of which is incorporated herein by reference in its entirety.

BACKGROUND

Field

Apparatuses and methods consistent with exemplary embodiments relate to an electronic device, a network system including the same, and a remote control method thereof, and more particularly, to a remotely controllable electronic device, a network system, and a remote control method thereof using low power.

Description of Related Art

Recently, multiple electronic devices have been increasingly used in home and office environments. The electronic devices may be connected to external devices through a network. When a user is outside, the external devices are able to remotely control an operation of the electronic devices in the home or office.

In detail, many recent electronic devices support a wake-on-LAN (hereinafter, referred to as WoL) and thus the electronic devices in an off state may be turned-on remotely. Here, the WoL function means a technology of enabling a network manager to turn-on power supplies for several electronic devices which are at a remote place or convert a computer which is in a power saving mode into a normal state. The WoL function is performed by transmitting a wake on frame or a specific packet from a server in which applications for remote management on a network are installed to electronic devices to be controlled remotely, even when the power supplies for the electronic devices are turned-off. In this case, a network adapter apparatus in the electronic device is supplied with power to receive the wake on frame or the specific packet, and thus when the network adapter apparatus receives the specific packet, the turned-off devices may be woken up remotely.

To perform the WoL function, a repeater, which repeats communications between the corresponding network and an external network, may use a network address translation (NAT) table (hereinafter, referred to as NAT table). For example, when an external device transmits a turn-on command for turning-on an electronic device, the repeater may receive the turn-on command signal from the outside and transmit the turn-on command signal to the corresponding electronic device by using a NAT table. The NAT table matches a public IP address assigned to the repeater with a private IP address of the external device. That is, the repeater is connected to the external network to determine addresses of the electronic devices to which signals are transmitted, by keeping the NAT table. However, when there is no communication between the electronic device and the external device for a predetermined time, the NAT table is not kept updated, and thus the address of the electronic device may not be found. As a result, a general user has difficulty maintaining the address of the corresponding electronic device in the NAT table all the time.

Therefore, a need exists for a low power technology of keeping electronic devices in a remotely controllable state. According to various exemplary embodiments, the network session of the electronic device is maintained using the low power, and thus the electronic device may be kept in the remotely controllable state.

SUMMARY

Exemplary embodiments overcome the above disadvantages and other disadvantages not described above. Also, exemplary embodiments are not required to overcome the disadvantages described above, and an exemplary embodiment may not overcome any of the problems described above.

Exemplary embodiments relate to an electronic device which may keep a remotely controllable state, a network system including the same, and a remote control method thereof using low power.

According to an aspect of an exemplary embodiment, an electronic device includes: a processor configured to control the electronic device while the electronic device is turned-on and turn-off the electronic device in response to a turn-off command; a network interface card (NIC) configured to periodically exchange a keep awake message with an external server through a repeater while the processor is turned-off; and a power supply configured to supply power to the NIC while the electronic device is turned-off.

The processor may be further configured to transfer TCP/IP session information to the NIC in response to the turn-off command.

The NIC may be configured to turn-on the electronic device in response to receiving a wake-on-LAN (WoL) signal.

The NIC may be further configured to receive an address resolution protocol (ARP) request message, and transmit an ARP response message including a media access control (MAC) address of the NIC in response to the ARP request message.

The NIC may include at least one of an Ethernet module and a Wi-Fi module, and the at least one of an Ethernet module and a Wi-Fi module may be configured to perform a function of processing TCP segment generation, TCP ACK response, checksum verification, IP datagram generation, and ARP, by detecting the WoL signal.

The module may be further configured to process at least one of a secure sockets layer (SSL) protocol and a transport layer security (TLS) protocol.

The NIC may be further configured to receive and process an ACK, which is a TCP response, and in response to receiving the ACK, generate an ACK which is a TCP response and transmit the generated ACK.

The NIC may be further configured to periodically exchange the keep awake message with the external server, and a transmission period of the keep awake message may be changed depending on a user setting.

The processor may include at least one central processing unit (CPU).

According to another aspect of an exemplary embodiment, a method of remotely controlling an electronic device includes: turning-off a processor of the electronic device in response to a turn-off command input to the electronic device; supplying power to a network interface card (NIC) of the electronic device while the electronic device is turned-off; and periodically exchanging, by the NIC, a keep awake message with an external server through a repeater while the processor is turned-off.

The turning-off of the processor may include transferring TCP/IP session information from the processor to the NIC.

The method may further include turning-on the electronic device in response to the NIC receiving a wake-on-LAN (WoL) signal.

The periodically exchanging may further include, in response to receiving an address resolution protocol (ARP) request message from the repeater, transmitting, by the NIC, an ARP response message including an MAC address of the NIC.

The NIC may include at least one of an Ethernet module and a Wi-Fi module, and the periodically exchanging may further include performing, by the at least one of the Ethernet module and the Wi-Fi module, a function of processing TCP segment generation, TCP ACK response, checksum verification, IP datagram generation, and ARP, by detecting the WoL signal.

The periodically exchanging may further include processing, by the at least one of the Ethernet module and the Wi-Fi the module, at least one of a secure sockets layer (SSL) protocol and a transport layer security (TLS) protocol.

The periodically exchanging may further include receiving and processing, by the NIC, an ACK, which is a TCP response, generating an ACK which is a TCP response and transmitting the generated ACK.

The periodically exchanging may further include, periodically exchanging, by the NIC, the keep awake message with the external server, and changing a transmission period of the keep awake message depending on user setting.

The processor may be a central processing unit (CPU).

According to yet another aspect of an exemplary embodiment, a network system for controlling an electronic device includes: an electronic device comprising: a processor configured to control the electronic device while the electronic device is turned-on and turn-off the electronic device in response to a turn-off command; and a network interface card (NIC) configured to periodically exchange a keep awake message with an external server through a repeater while the processor is turned-off to maintain a network session with an external server; and a repeater configured to store a network address conversion table and repeat communications between the electronic device and the external server to maintain a current address of the electronic device within the network address conversion table. The repeater may be further configured to transmit, in response to receiving a control signal directed to the electronic device from an external client through the external server, the control signal to the electronic device.

Additional and/or other aspects and advantages will be set forth in part in the description which follows and, in part, will be obvious from the description, or may be learned by practice of exemplary embodiments.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
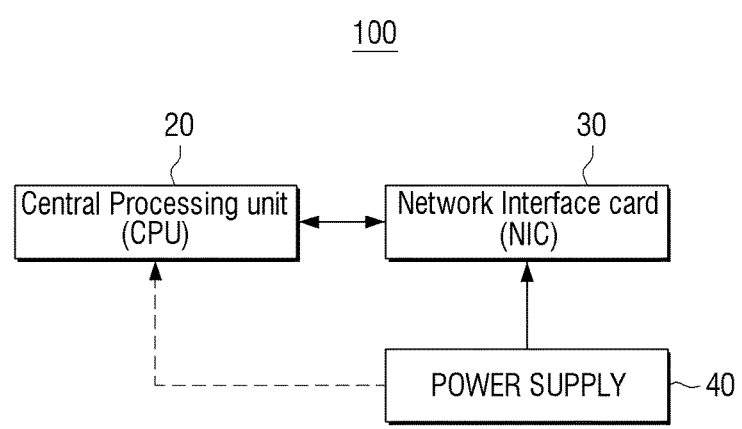
FIG. 1 is a block diagram schematically illustrating a configuration of an electronic device according to an exemplary embodiment.

Hereinafter, exemplary embodiments will be described in detail with reference to the accompanying drawings.

In the following description, same drawing reference numerals are used for the like or similar elements, even in different drawings. The matters defined in the description, such as detailed construction and elements, are provided to assist in a comprehensive understanding. Accordingly, it is apparent that the exemplary embodiments can be carried out without those specifically defined matters. Also, well-known functions or constructions are not described in detail because they would obscure the disclosure with unnecessary detail. Expressions such as "at least one of," when preceding a list of elements, modify the entire list of elements and do not modify the individual elements of the list.

FIG. 1 is a block diagram schematically illustrating a configuration of an electronic device according to an exemplary embodiment.

Referring to FIG. 1, an electronic device 100 may include a processor, e.g., a central processing unit (CPU) 20, a network interface card (NIC) 30, and a power supply 40.

The CPU 20 is configured to control an operation of the electronic device 100 while the electronic device 100 is turned-on. The CPU 20 may perform operations of a user area (application layer) and a kernel area (IP layer, TCP layer) among several layers of a network stack. The CPU 20 is activated by receiving power from the power supply 40. Power supplied from the power supply 40 to the CPU 20 is cut off when the electronic device 100 is turned-off.

The network interface card (NIC) 30 is an extended network card which is installed in a computer to be able to be connected to a network. The NIC 30 may perform a network operation by being supplied with ordinary power, even while the electronic device 100 is turned-off. For example, while the CPU 20 is turned-off, the NIC 30 may receive a keep awake message from an external server and perform processing like generating and transmitting a response to the received keep awake message. Further, the NIC 30 may receive an address resolution protocol (ARP) request message and perform processing, like generating and transmitting an ARP response message including a media access control (MAC) address of the NIC 30, as a response to the received ARP request message. The messages are transmitted to the external server through a repeater which repeats communications with a network to which the electronic device 100 is connected. The repeater may keep a NAT table during the transmission and reception of the messages to keep a remotely controllable state in which a connection with the external network is continued. Detailed components will be described below.

Further, the NIC 30 may include at least one of an Ethernet module and a Wi-Fi module. The module included in the NIC 30 may perform a function of processing transmission control protocol (TCP) segment generation, TCP ACK response, checksum verification, internet protocol (IP) datagram generation, and address resolution protocol (ARP) by detecting a wake-on-LAN-(WoL) signal to implement a function required to turn-on a power supply for the electronic device 100. Further, the module included in the NIC 30 may receive or generate and process ACK and further process a secure sockets layer (SSL) protocol or a transport layer security (TLS) protocol for security. Here, the module included in the NIC 30 may perform an Rivest Cipher 4 (RC4) or advanced encryption standard (AES) encryption/decryption function.

The power supply 40 is configured to supply ordinary power to the NIC 30. The power supply 40 ordinarily supplies power to various internal components of the electronic device 100 in addition to the CPU 20 while the electronic device 100 is turned-on. The power supply 40 may ordinarily supply power to the NIC 30 to enable the NIC 30 to perform communications even while the electronic device 100 is turned-off. On the other hand, while the electronic device 100 is turned-off, the power supply 40 may cut off the supply of power to the CPU 20 as described above. Therefore, it is possible to reduce power consumed by the CPU 20 while the electronic device 100 is turned-off.

Figure 2:
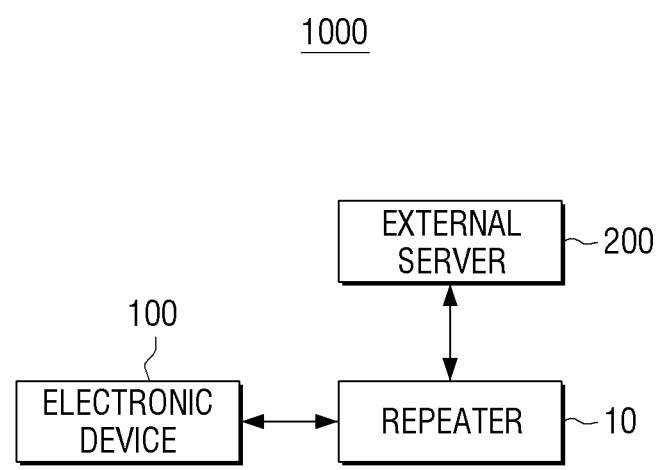
FIG. 2 is a block diagram schematically illustrating a configuration of a remote control system according to an exemplary embodiment.

FIG. 2 is a block diagram schematically illustrating a configuration of a remote control system according to an exemplary embodiment.

Referring to FIG. 2, a remote control system 1000 may be configured to include the electronic device 100 and the external server 200. Further, a repeater 10 may be disposed between the electronic device 100 and the external server 200. The repeater 10 is configured to repeat a data packet or a signal transmitted and received between the environment (for example, home or office, and the like) in which the electronic device 100 is positioned and the external network. According to the exemplary embodiment, the repeater 10 may be a router, an access point (AP) or IP sharer.

The electronic device 100 may exchange the keep awake message with the external server 200 through the repeater 10. Here, the electronic device 100 may be one of any various communicating devices such as a desktop computer, a laptop computer, a mobile computing apparatus, a smart phone, a feature phone, a tablet computer, a set top box, and a wearable device.

In detail, the electronic device 100 may receive the keep awake message transmitted from the external server 200 in a preset period unit to maintain a connection with the external server 200 and transmit the keep awake response message to the external server 200. The keep awake message means a message transmitted and received between devices to confirm whether a data link between the devices is operated well and to prevent the data link from being broken.

In detail, it is possible to maintain a network address translation (NAT) table of the repeater 10 by the exchange of the keep awake message. The NAT means a technology of changing an IP header address to another address. The repeater 10, connected to an external communication network, informs the outside of only a public IP address assigned to the repeater, and uses only a private IP address in the inside thereof, and converts the public IP address and the private IP address into each other, if necessary. In this case, the repeater 10 may transmit a command signal input from the outside to electronic devices of the private band by using the NAT table written by matching the public IP address assigned to the repeater with the private IP address which may be converted into the public IP address within the private IP band. That is, the external client 300 connected to the repeater 10 may find an address of the electronic device 100 in the home to which a signal is transmitted, by maintaining the NAT table in the repeater 10.

First, the electronic device 100 may generate the keep awake message. In detail, the keep awake message may be generated in the NIC 30 which is included in the electronic device 100. In this case, the NIC 30 is a communication device including a communication module which may transmit and receive data to and from the external network, and may include a peripheral component interconnect (PCI) interface for connecting to a PCI bus which is an internal bus, an MAC processor for processing a media access control (MAC) which is an upper layer, a physical layer (PHY) device for processing a physical layer, a buffer required for packet processing, a boot read only memory (ROM), a connector, and the like. Further, the NIC 30 may be either industry standard architecture (ISA) or extended industry standard architecture (EISA), depending on a form of a board. As the buffer, a non-volatile memory, such as a flash memory, may also be used, and a volatile memory, such as an random access memory (RAM), may also be used. The NIC 30 may be connected to the external device through a local area network (LAN) and the Internet may be connected to the external device by a wireless communication scheme, for example, global system for mobile communications (GSM), universal mobile telecommunications system (UMTS), long-term evolution (LTE), and wireless broadband (WiBRO). Here, the external device may be the electronic device 100 of FIG. 2 or another electronic device having the same function as the electronic device 100 of FIG. 2.

The NIC 30 may transmit information for establishing and maintaining a network session of the electronic device 100. In detail, the NIC 30 may transmit address information (such as an IP address) of the external server 200 required to establish the network session with the electronic device 100 and ping interval information required to maintain the network session.

In this case, the NIC 30 may exchange the keep awake message with the external server 200 through the repeater 10 while the electronic device 100 is turned-off. In particular, the CPU 20 of the electronic device 100 may be turned-off while the network session with the external server 200 is maintained. Here, the network session means that two devices are logically connected to each other in the network environment and may use a secure sockets layer (SSL) or transport layer security (TLS) connection.

In detail, in the network stack of the electronic device 100, the minimum functions required to exchange the keep awake message operated in the CPU 20 are additionally implemented in the communication module included in the NIC 30. Thus, it is possible to exchange the keep awake message with the external server 200 only by the NIC 30 connected to an ordinary power.

In this case, the communication module included in the NIC 30 may be configured as an Ethernet module or a Wi-Fi module. In this case, the minimum function required for the exchange of the keep awake message may include a function of processing TCP segment generation, TCP ACK response, checksum verification, IP datagram generation, and ARP. In this case, the communication module included in the NIC 30 may further process a secure sockets layer (SSL) protocol or a transport layer security (TLS) protocol for security. Here, the module included in the NIC 30 may perform the RC4 (AES) encryption/decryption function.

The keep awake message may include information on a transmission period of the keep awake message. The NIC 30 transmits the keep awake message to the external server 200 through the repeater 10 when reaching the transmission period of the keep awake message. In this case, the communication module included in the NIC 30 may perform functions required to process the corresponding message. That is, it is possible to additionally stack an IP layer, a TCP layer, a transport layer security (TLS) and an application layer, which are on a network stack of the CPU 20 of the electronic device 100, on a physical layer (PHY layer) and a data link layer of the communication module, and process only the minimum function required to process the keep awake message in the additionally stacked layers. Thereby, when the power supply 40 supplies power to only the NIC 30 included in the electronic device 100, that is, even though the power supply 40 does not supply power to the CPU 20 of the electronic device 100, the network session may be maintained with the minimum power.

However, when the CPU 20 is turned-off, in the case in which the network session is generated between the CPU 20 and the external server 200, the CPU 20 may transfer information required to maintain the network session to the NIC 30 by exchanging the keep awake message between the CPU 20 and the external server 200 so as to maintain the network session of the electronic device 100 and the external server 200.

In this case, the information required to maintain the network session includes a source port, a destination port, a sequence number, and an acknowledgement number as the TCP session information, and a source IP address and a destination IP address as the IP session information. In addition, additional information required to maintain the network session may be transferred to the NIC 30 by the keep awake connection. The additional information may include symmetric key encryption, a message authentication code key, an initialization vector, a sequence number, and the like, which are used in the SSL and may include a sequence number, time information, and the like which are used in the application layer.

Next, when the processed keep awake message is transmitted to the external server 200, the NIC 30 may receive and process ACK which is the TCP response from the external server 200. Further, the NIC 30 may receive and process the keep awake message transmitted from the external server 200. In this case, the NIC 30 may generate and transmit the ACK, which is the TCP response, toward the external server 200. Further, the NIC 30 may process a keep awake response message transmitted from the external server 200 to the electronic device 100. In this case, the NIC 30 may generate and transmit the ACK, which is the TCP response from the electronic device 100, toward the external server 200.

Figure 3:
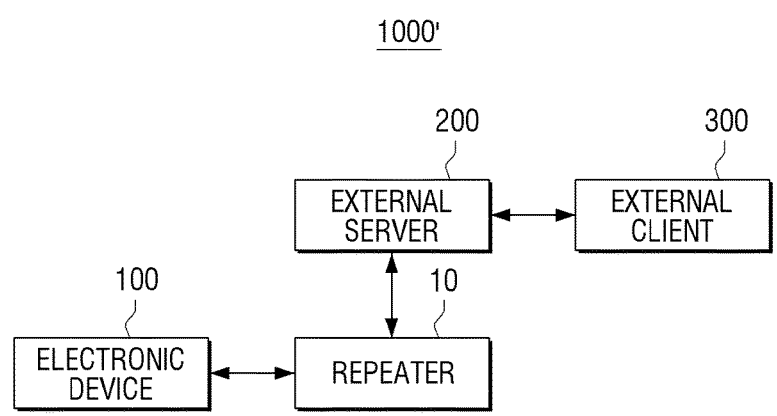
FIGS. 3 and 4 are block diagrams schematically illustrating a configuration of a remote control system according to another exemplary embodiment.
Figure 4:
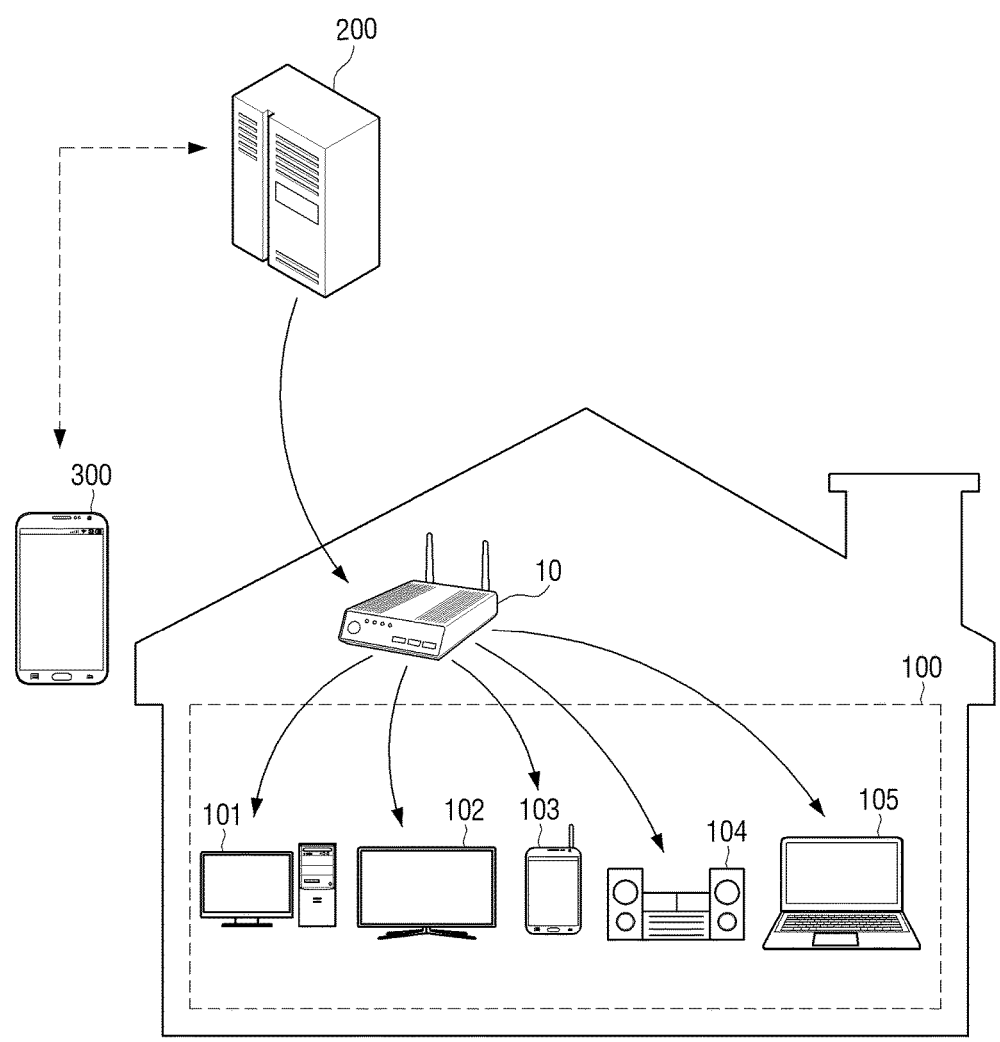

FIGS. 3 and 4 are diagrams schematically illustrating a configuration of a remote control system according to another exemplary embodiment. Hereinafter, a description of the overlapping components with those of FIG. 2 will be omitted.

Referring to FIG. 3, a remote control system 1000' may be configured to include the electronic device 100, the external server 200, and an external client 300. Further, the repeater 10 may be disposed between the electronic device 100 and the external server 200. Meanwhile, according to the exemplary embodiment, the repeater 10 may mean the router or the AP.

Referring to FIG. 4, the external client 300 broadcasts a specific type of data (for example, magic packet, and the like) including an MAC address of a device to be woken, to wake up a specific device, Here, the electronic devices 101, 102, 103, 104, and 105 in the home do not have the same subnet environment as the external client 300, and therefore the setting to connect the external client 300 and the electronic device to be woken by the repeater 10 needs to be performed. However, it is very difficult to directly perform the setting.

Here, the external client 300 may use the external server 200 to establish the network session with the electronic device 100. In detail, the external server 200 and the electronic device 100 may maintain the NAT table on the repeater 10 while exchanging the keep awake message with each other. Therefore, it is possible to find out the electronic device 100 with which the external client 300 may communicate by using the address of the electronic device 100 stored in the repeater 10. That is, the external server 200 periodically performs a ping with the electronic device 100, not with the external client 300, so as to prevent the NAT table storing the connection information between the external client 300 of the repeater 10 and the electronic device 100 from being updated.

Meanwhile, the external client 300 may use the maintained network session to transmit the WoL signal to the electronic device 100. Here, the electronic device 100 means an electronic device which is designated as a target of power supply management by the external client 300 at a remote place. Here, the electronic device 100 and the external client 300 may include a computer terminal, such as a PC, a notebook and any other portable electronic device with a communication function.

Here, the external client 300 may use access information, including an IP address assigned to the electronic device 100, to transmit the WoL signal. In this case, the external client 300 may use MAC address information, which is unique identification information of the NIC 30 included in the electronic device 100, included in the NAT table maintained by periodically exchanging the keep awake message between the target electronic device 100 and the external server 200, to transmit the WoL signal to the target electronic device 100. In this case, the external client 300 may include a power supply turn-on command of the target electronic device 100.

Meanwhile, for the WoL signal, the external client 300 may transmit a message with a specific format. In this regard, the electronic device 100 needs to receive and process the message with the specific format. This may be implemented by additionally stacking the IP layer, the TCP layer, the transport layer security (TLS), and the application layer, which are on the network stack of the CPU 20 of the electronic device 100, on the communication module included in the NIC 30 as described with reference to FIG. 1. In this case, the additionally stacked layers may include a function of receiving and processing the WoL signal. Even in this case, when the electronic device 100 receives the WoL signal, the ACK, which is the TCP response toward the external client 300, is generated and may be transmitted through the repeater 10.

Meanwhile, the electronic device 100 may generally generate the ARP response message as a response to the ARP request message. The ARP is used in an Ethernet environment, and the repeater 10 may broadcast an Ethernet frame called an ARP request to all the hosts on the network. In this case, an ARP layer of the target electronic device 100 receives a broadcast packet, and when requesting its own IP, may generate the ARP response message and transmit the generated ARP response message to the repeater 10. In this case, the ARP response message includes a hardware (HW) address of the target electronic device 100, that is, a MAC address, and when receiving the ARP response message, the repeater 10 may know the HW address of the target electronic device 100.

Figure 5:
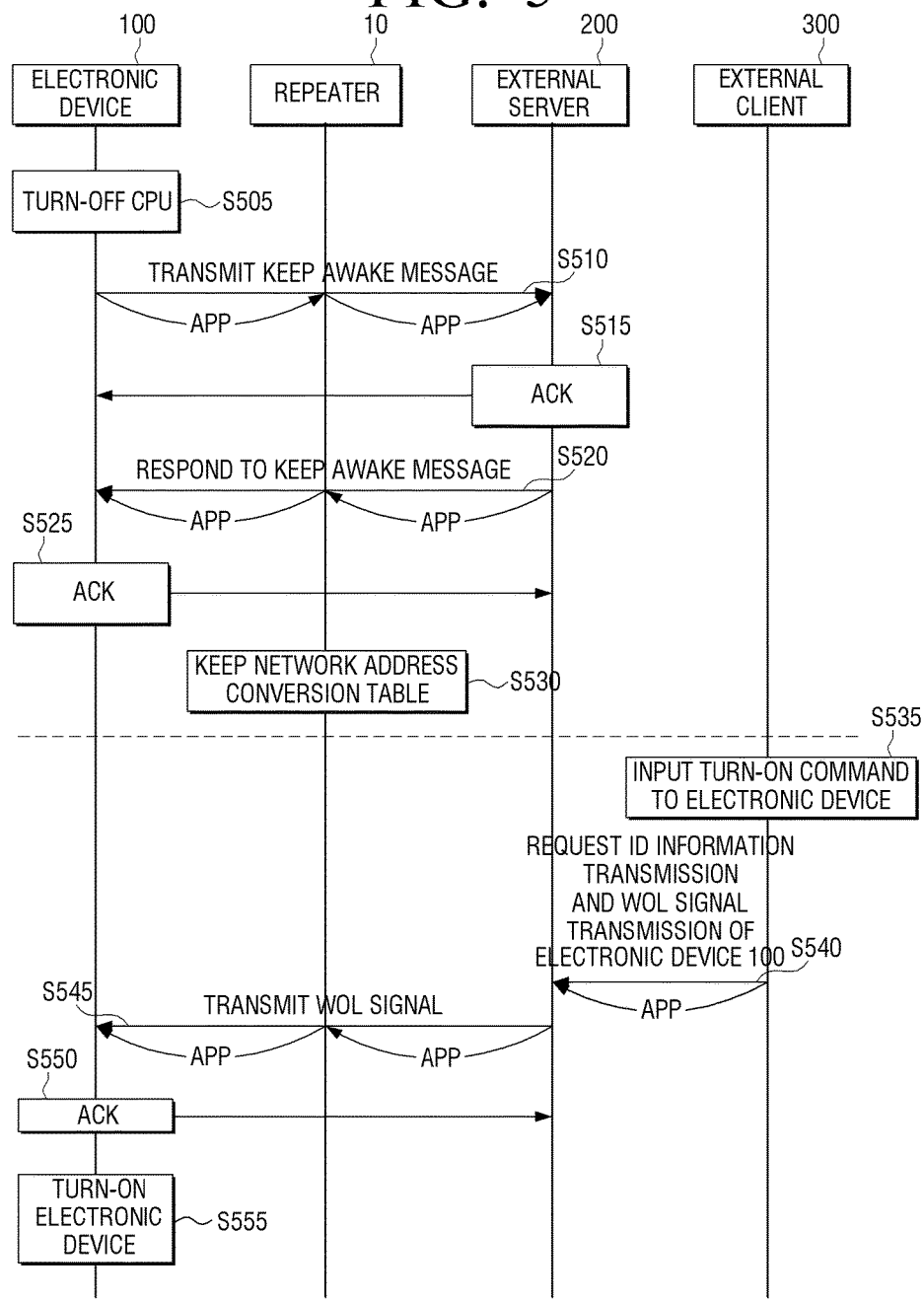
FIG. 5 is a diagram illustrating a turn-on process of an electronic device depending on a WoL signal, according to an exemplary embodiment.

FIG. 5 is a diagram illustrating a turn-on process of the electronic device 100 depending on the transmission of the WoL signal, according to an exemplary embodiment.

As illustrated in FIG. 5, the CPU 20 controlling the operation of the electronic device 100 is also turned-off while the electronic device 100 is turned off (S505). In this case, the NIC 30 included in the electronic device 100 may be supplied with ordinary power from the power supply 40 even while the CPU 20 is turned-off. In this case, the NIC 30 extracts a network layer including only the minimum functions for packet processing from the network stack on the CPU 20 to process the communication protocol for exchanging the keep awake message, and additionally implements the extracted network layer in the existing NIC (30) communication module. In this case, a small network stack may be implemented on the communication module by a method for additionally stacking the extracted network layer on the PHY layer and the data link layer of a communication module included in the existing NIC 30. However, when the CPU 20 is turned-off, in the case in which the network session is generated between the CPU 20 and the external server 200, the CPU 20 may transfer information required to maintain the network session to the NIC 30 by exchanging the keep awake message between the CPU 20 and the external server 200, so as to maintain the network session of the electronic device 100 and the external server 200.

In this case, the information required to maintain the network session includes a source port, a destination port, a sequence number, and an acknowledgement number as the TCP session information, and a source IP address and a destination IP address as the IP session information. In addition, additional information required to maintain the network session may be transferred to the NIC 30 by the keep awake connection. The additional information may include symmetric key encryption, a message authentication code key, an initialization vector, a sequence number, and the like, which are used in the SSL and may include a sequence number, time information, and the like, which are used in the application layer.

Therefore, the electronic device 100 may transmit the keep awake message to the external server 200 through the repeater 10 to request the keep awake state (S510). In this case, the electronic device 100 may transmit the address resolution protocol (ARP) request message to the repeater 10 on the same subnet and the repeater 10 to the external server 200 through a plurality of repeaters to secure the MAC address of the repeater 10 and the external server 200. The ARP request may be executed in all the steps. When receiving the keep awake message, the external server 200 may transmit the ACK signal to the electronic device 100 as a response thereto (S515). Then, the external server 200 may transmit the keep awake message responding to the received keep awake message to the electronic device 100 (S520). When receiving the keep awake message, the electronic device 100 may transmit the ACK signal as a response thereto to the external server 200 (S525). By the above process, the external server 200 and the external client 300 may maintain the network session while the keep awake message is exchanged with each other. In this case, the keep awake message may be exchanged at a preset period. By the exchange of the keep awake message, the repeater 10 may not update, but maintain the NAT table about the electronic device 100 (S530). Because the NAT table is not updated, the repeater 10 may maintain access information mapping the private IP address to the public IP address to store and find out the converted public IP address of the target electronic device 100 without the additional setting of the user.

The external client 300 may perform the turn-on command of the electronic device 100 in which the power supply is turned-off while the NAT table is maintained and the network session is maintained (S535). The turn-on command of the electronic device 100 may be performed by requesting the transmission of the identification information of the electronic device 100 to the external server 200 and the transmission of the WoL signal (S540). In this case, the external server 200 may transmit the WoL signal based on the ID information of the electronic device received from the external client 300 to the target electronic device 100 through the repeater 10 (S545).

In this case, all the processes of exchanging the keep awake message with the external server 200 and processing the turn-on command received from the external client 300 may be performed only by the NIC 30 included in the turned-off electronic device 100. That is, the CPU 20 of the electronic device 100 does not consume power, and only the NIC 30 may process the keep awake message to save standby power consumption of the electronic device 100. The packet processing by only the NIC 30 may be implemented by additionally stacking the IP layer, the TCP layer, the TLS, and the application layer, which include only the minimum functions among the communication protocols on the network stack of the CPU 20 for processing the foregoing messages, on the communication module included in the NIC 30.

When receiving the WoL signal, the electronic device 100 may transmit the ACK response to the external server 200 (S550) and transmit a specific signal to the power supply 40 to turn-on the power supply for the electronic device 100 (S555).

Figure 6:
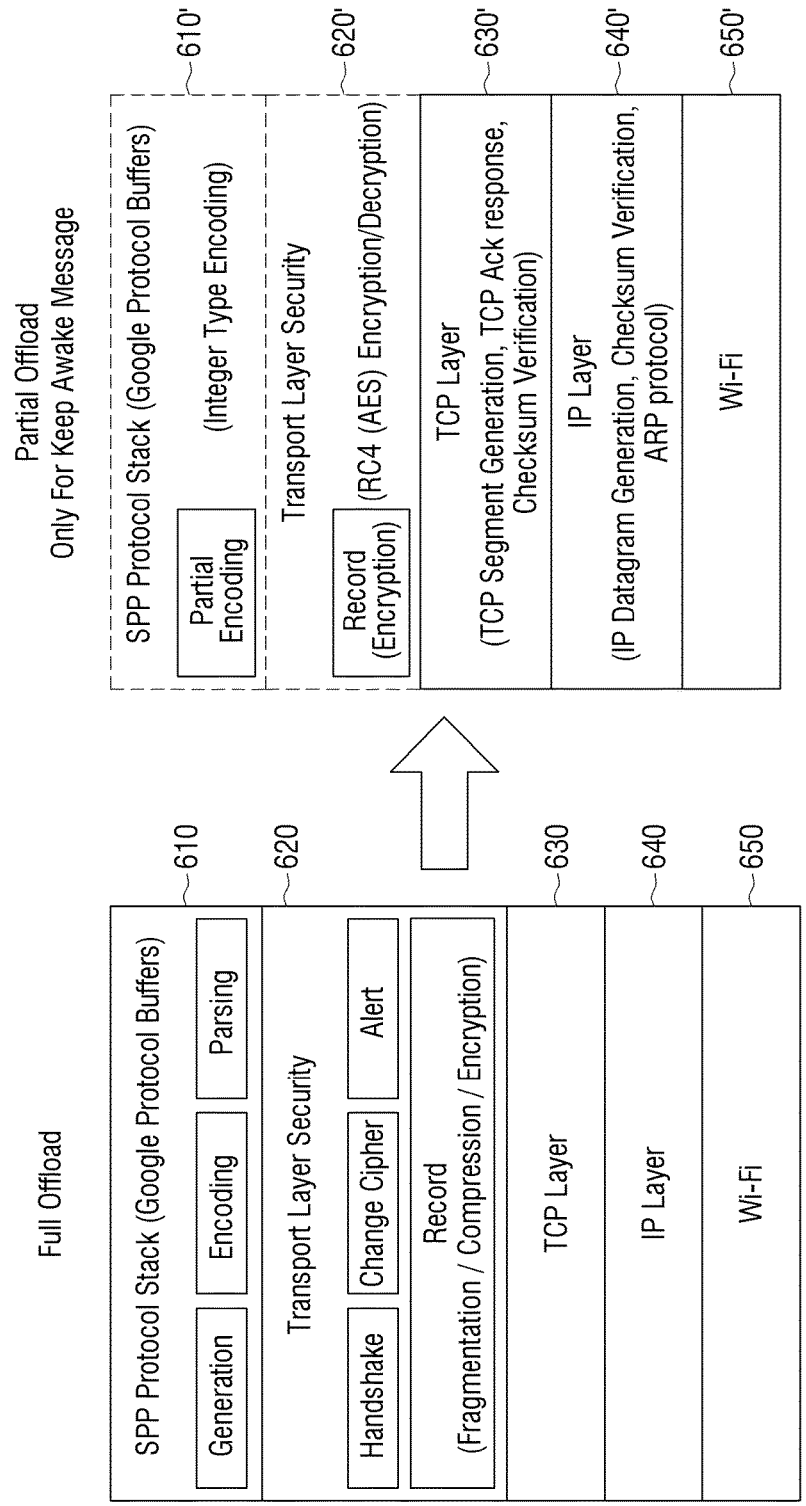
FIG. 6 is a diagram illustrating an example in which a network stack for exchanging a keep awake message is implemented in a Wi-Fi module.

FIG. 6 is a diagram illustrating an example in which the network stack for exchanging the keep awake message is implemented in the Wi-Fi module.

As illustrated in FIG. 6, an application layer 610, a TLS 620, a TCP layer 630, and an IP layer 640 are present in the network stack of the CPU 20 and a Wi-Fi module layer 650 as the communication module included in the NIC 30 configures a lower layer.

Only the minimum functions required to exchange the keep awake message operated in the CPU 20 on the network stack of the electronic device 100 as described above are additionally implemented in the communication module included in the NIC 30. Thus, it is possible to exchange the keep awake message with the external server 200 only by the NIC 30 connected to the power supply 40.

In this case, the communication module included in the NIC 30 may be configured as an Ethernet module or a Wi-Fi module. In this case, the minimum functions required to exchange the keep awake message may be functions required to maintain the TCP connection. For this purpose, the communication module included in the NIC 30 may include a function of processing TCP segment generation, TCP ACK response, and checksum verification of a TCP layer 630' and IP datagram generation and ARP of the IP layer 640'. In this case, the communication module included in the NIC 30 may further process a secure sockets layer (SSL) protocol or a transport layer security (TLS) protocol for security. Here, the communication module included in the NIC 30 may perform the RC4 (AES) encryption/decryption function. Further, the communication module included in the NIC 30 may further perform a function of processing an integer type encoding protocol for encoding the keep awake message.

In detail, the function of processing the integer type encoding protocol means a function of encoding the keep awake message to be transmitted in an integer type. A function of processing Rivest Cipher 4 (RC4) or advanced encryption standard (AES) encryption/decryption protocol is a function of encrypting data. The encryption algorithm may interrupt an illegal access to data through the router or information intercept by stealing a key or a session halfway. The RC4 or the AES encryption/decryption protocol may be operated based on the transport layer security (TLS) layer which may process the user authentication using ID/password and may improve the security of application programs. The TLS connection means a communication protocol which encrypts and transmits the data between the external client 300 and the electronic device 100 in the transmission layer. The TLS connection is the encryption scheme of the transmission layer and may be used independent of application layer protocols such as hypertext transfer protocol (HTTP), network news transfer protocol (NNTP), file transfer protocol (FTP), and extensible messaging and presence protocol (XMPP).

The function of processing the TCP segment generation protocol means a function of generating a segment having an IP address and a port number of a target host which will be connected to establish the connection between the electronic device 100 and the external network. Here, the segment means a data unit which is transmitted using the TCP/IP. The segment may include a source port address, a destination port address, an initial sequence number of a source transmitting a packet, and the like. The data are segmented before being transmitted and the sequence number may be used to assemble the segment in an accurate order.

A function of processing a TCP ACK response protocol means a function of issuing a response to the reception of a packet so as to secure that the packet is transmitted. The source continuously re-transmits data until ACK is transmitted from a destination, and therefore a loss of the packet due to an error during the transmission may be reduced.

A function of processing the checksum verification protocol which is one type of redundancy check means a cyclic redundancy check (CRC) as a method for protecting integrity of data by error correction. The checksum may obtain a checksum number by adding arranged data, and may be reconfigured by a bit number defined as a modular of the defined bit number.

A function of processing the IP datagram generation protocol means a function of generating IP datagram which is a basic unit of information of which the header includes data, such as an address of a source, an address of a destination, and processing priority, in addition to a data main body of transport information.

A function of processing the AP protocol means a function of processing the address resolution protocol (ARP) which is a protocol used to know the MAC address of the destination using the IP address in the Ethernet or the Wi-Fi.

The keep awake message is transmitted on the communication module by the following process.

First, the keep awake data which will be transmitted by the application of the user are generated and transmitted by calling a system call. When the system call is called, the data are converted to a kernel area. A kernel socket has a send socket buffer for transmission and a receive socket buffer for reception, and when the system call is called, the data of the user area are copied to a kernel memory and the keep awake data are added to a rear portion of the send socket buffer. Next, the TCP is called and when the current TCP state permits the transmission of the keep awake data, a new TCP segment, that is, a packet, is generated. When the keep awake data may not be transmitted (for example, flow control, and the like), the system call ends and a control right is handed over to the application of the user area. The TCP segment includes a TCP header and a payload. The payload includes data of the send socket buffer which does not receive ACK. Next, the TCP checksum is calculated. The calculation of the checksum may include pseudo header information (IP addresses, segment length, protocol number). Here, at least one packet may also be transmitted depending on the TCP state. However, when the network stack uses a checksum offload technology, the kernel does not calculate the TCP checksum and the NIC 30 may instead calculate the checksum.

The generated TCP segment moves to the IP layer 640' and in the IP layer 640', the IP header is added to the TCP segment and the IP routing is performed. The IP routing means a process of finding out an IP address (next hop IP) of subsequent equipment for proceeding to a destination IP address. In the IP layer 640', the IP header checksum is calculated and added and then data are transmitted to the Wi-Fi layer or the Ethernet layer 650'. In the case of the Ethernet layer, the MAC address of the next hop IP may be found by using the ARP. Next, the Ethernet header is added to the packet, and thus, the keep awake packet is completed. As a result of the IP routing, the NIC 30 used at the time of transmitting the packet to the next hop IP and the corresponding IP may be found. Therefore, when a driver of the transmit NIC 30 is called, the driver requests the keep awake packet transmission depending on a driver-NIC communication protocol which is defined by a NIC manufacturer. The NIC 30 receives a packet transmission request, copies the keep awake packet included in a main memory to its own memory, and transmits the copied keep awake packet to the network.

Meanwhile, the received WoL signal is processed on the communication module by the following process. The NIC 30 may receive the WoL signal from the outside. First, the NIC 30 writes the received WoL packet in its own memory. Here, the WoL packet is defined as meaning data which may perform the WoL function included in the WoL signal. The NIC 30 checks whether the packet is correct by the CRC and transmits the checked packet to the memory buffer. The buffer is a memory previously assigned for packet reception by requesting the driver to the kernel and after being assigned, the driver notifies the NIC 30 of the address and size of the memory. The NIC receives the WoL packet and when there is no memory buffer previously assigned by the driver, the NIC 30 may drop the packet. The NIC 30 transmits the WoL packet to the memory, and then the driver may check whether a new packet is a packet which may be processed by the driver while seeing the new packet. Here, the driver-NIC communication protocol defined by a manufacturer is used. For the driver to transfer the WoL packet to an upper layer, an operating system needs to be understood, and therefore the received packet may be packaged as a packet structure used by the operating system, and the packaged packet may be transferred to the upper layer.

It is checked whether the packet is correct even in the Ethernet layer or the Wi-Fi layer, and when the packet is transferred to the IP layer 640', it may be checked whether the packet is correct by confirming the IP header checksum, even in the IP layer 640'. Here, it may be determined whether the local equipment processes the packet using the IP routing or the packet is transmitted to other equipment. The packet from which the IP header is removed is transferred to the TCP layer 630'. A process of checking whether the packet is correct even in the TCP layer 630' is performed, and the TCP checksum may be confirmed. Next, the TCP layer 630' finds a TCP control block and processes a packet obtained by performing the protocol. When new data are received, the data are added to the receive socket buffer, and a new TCP packet (for example, ACK packet) is transmitted depending on the TCP state, and then a process of processing the TCP/IP receiving packet ends. Next, when the application calls the system call, the data are converted to the kernel area and the data in the socket buffer are copied to a memory in a user space. After the copied data are removed from the socket buffer, the TCP is called and the packet is transmitted depending on the protocol state. When there is no packet transmission, the system call ends.

Figure 7:
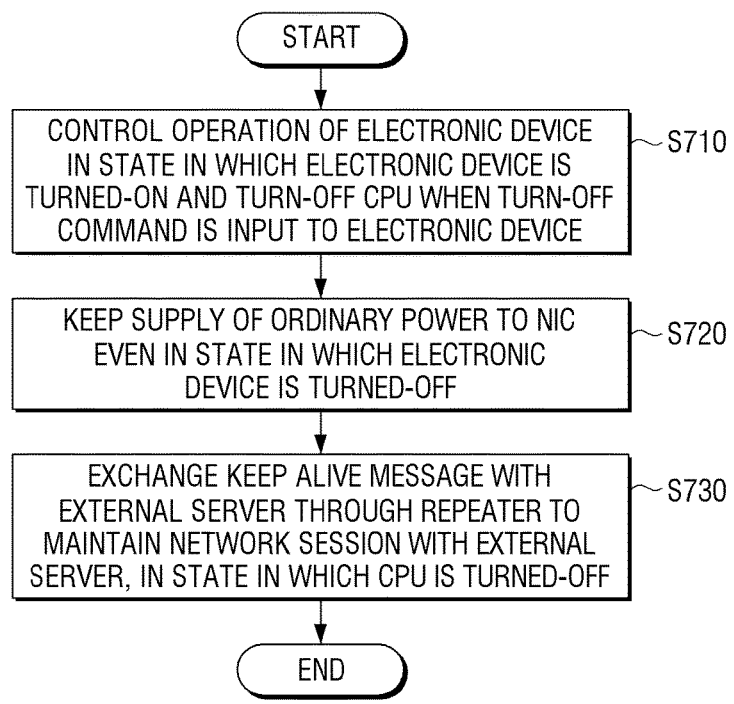
FIG. 7 is a flow chart illustrating a remote control method according to an exemplary embodiment.

FIG. 7 is a flow chart for describing a remote control method according to an exemplary embodiment. In detail, a process of maintaining a network session between the electronic device 100 and the external server 200 by exchanging the keep awake message will be described with reference to FIG. 7.

First, when the turn-off command is input to the electronic device 100 while the electronic device 100 is turned-on, the CPU 20 for controlling the operation of the electronic device 100 is turned-off (S710). In this case, a supply of power to the CPU 20 is cut off. In this case, ordinary power is supplied to the NIC 30 even while the electronic device 100 is turned-off (S720). However, when the CPU 20 is turned-off, in the case in which the network session is generated between the CPU 20 and the external server 200, the CPU 20 may transfer information required to maintain the network session to the NIC 30 by exchanging the keep awake message between the CPU 20 and the external server 200 so as to maintain the network session of the electronic device 100 and the external server 200. While the CPU 20 is continuously turned-off, the keep awake message is exchanged between the external server 200 and the electronic device 100 through the repeater 10, and thus the network session between the external server 200 and the electronic device 100 is maintained (S730). Here, the network session means that the SSL or TLS connection may be used as the logic connection between two devices in the network environment. The exchange of the keep awake message with the external server 200 only by the NIC 30 may be made without performing the operation of the network stack of the CPU 20. In detail, the network stack of the CPU 20 is modified to perform the function of processing the minimum protocol required to exchange the keep awake message, and is directly operated on the communication module included in the NIC 30, not on the CPU 20, such that the exchange of the keep awake message with the external server 200 may be performed only by the NIC 30.

Figure 8:
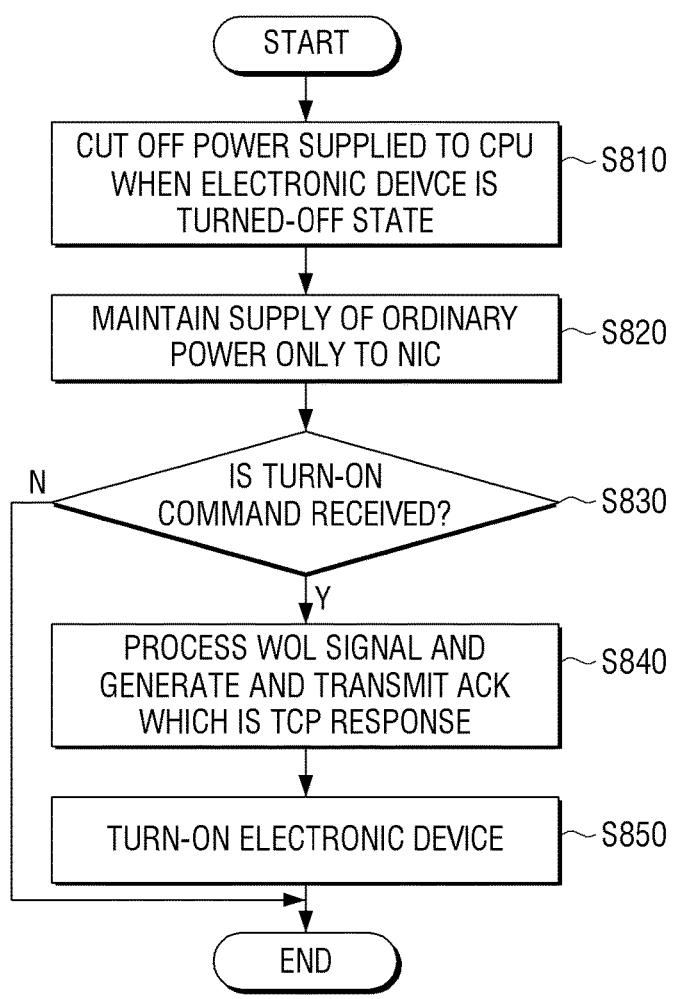
FIG. 8 is a flow chart illustrating a turn-on process of turning-on an electronic device according to an exemplary embodiment.

FIG. 8 is a flow chart illustrating a process of turning-on an electronic device while a network session between an electronic device and an external server is maintained.

First, when the electronic device 100 is turned-off, the power supplied to the CPU 20 is cut off and thus the CPU 20 is turned off (S810). In this case, ordinary power is supplied to the NIC 30 even while the electronic device is turned-off (S820). When the turn-on command is input from the external client 300 while the ordinary power is supplied only to the NIC 30 (S830: Y), the NIC 30 receives and processes the WoL signal through the repeater 10. In this case, the ARP request packet is received between the electronic device 100 and the repeater 10, the repeater 10 and the external server 200, and the external server 200 and the external client 300, and as a response thereto, an operation of generating and transmitting the ARP response packet may be performed. Further, a plurality of repeaters may be present between the external server 200 and the external client 300. In this case, the same operation may be performed between the respective repeaters. When receiving the WoL signal, the NIC 30 generates the ACK packet which is the TCP response and transmits the generated ACK packet to the external client 300 through the repeater 10 (S840). The NIC 30 processes the WoL signal and transmits the signal to the power supply 40 to perform the operation of turning-on the power supply for the electronic device 100 (S850).

As set forth above, according to the exemplary embodiments, the network session of the electronic device is maintained using the low power, and thus the electronic device may be kept in a remotely controllable state.

The remote control method of the electronic device 100 according to various exemplary embodiments as described above may be implemented as programs and may be provided to an image processing apparatus.

For example, there may be provided a non-transitory computer readable medium in which programs are stored, the programs, when executed by at least one processor, performing a step of turning-off the CPU 20 when the turn-off command is input to the electronic device 100, a step of supplying ordinary power to the NIC 30 even while the electronic device 100 is turned-off, and a step of maintaining the network session with the external server 200 by exchanging the external server 200 with the keep awake message through the repeater 10 while the CPU 20 is turned-off.

The non-transitory computer readable medium is a medium that semi-permanently stores data therein and is readable by a device. In detail, various applications and programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

According to various exemplary embodiments as described above, the network session of the electronic device is maintained using the low power and thus the electronic device may be kept in the remotely controllable state.

Although exemplary embodiments have been disclosed for illustrative purposes, those skilled in the art will appreciate that various modifications, additions and substitutions are possible, without departing from the scope and spirit of the disclosure as set forth in the accompanying claims. Accordingly, such modifications, additions and substitutions should also be understood to fall within the scope of the present disclosure.

What is claimed is:

1. A method of remotely controlling an electronic device, the method comprising:
controlling, by a processor of the electronic device, a network interface card (NIC) of the electronic device to communicate with an external server through a repeater based on TCP/IP session information;
transferring, in response to receiving a turn-off command for the electronic device, the TCP/IP session information and additional information to from the processor to the NIC;

turning-off the processor;
supplying power to the NIC while the processor is turned-off; and
periodically exchanging, by the NIC, a keep awake message with the external server through the repeater while the processor is turned-off based on the TCP/IP session information and the additional information sent from the processor to the NIC in response to the turn-off command to maintain a network session with the external server,
wherein the additional information sent from the processor to the NIC in response to the turn-off command comprises at least one among symmetric key encryption, a message authentication code key and an initialization vector.

2. The method as claimed in claim 1, further comprising turning-on the electronic device in response to the NIC receiving a wake-on-LAN (WoL) signal.

3. The method as claimed in claim 2, wherein the periodically exchanging further comprises, in response to receiving an address resolution protocol (ARP) request message from the repeater, transmitting, by the NIC, an ARP response message including an MAC address of the NIC.

4. The method as claimed in claim 1, wherein the NIC includes at least one of an Ethernet module and a Wi-Fi module, and
the periodically exchanging further comprises performing, by the at least one of the Ethernet module and the Wi-Fi module, a function of processing TCP segment generation, TCP ACK response, checksum verification, IP datagram generation, and ARP, by detecting a wake-on-LAN (WoL) signal.

5. The method as claimed in claim 4, wherein the periodically exchanging further comprises processing, by the at least one of the Ethernet module and the Wi-Fi module, at least one of a secure sockets layer (SSL) protocol and a transport layer security (TLS) protocol.

6. The method as claimed in claim 1, wherein the periodically exchanging further comprises receiving and processing, by the NIC, the keep awake message, generating an ACK which is a TCP response and transmitting the generated ACK.

7. The method as claimed in claim 1, wherein the periodically exchanging further comprises, periodically exchanging, by the NIC, the keep awake message with the external server, and
changing a transmission period of the keep awake message depending on user setting.

8. The method as claimed in claim 1, wherein the processor is a central processing unit (CPU).

9. An electronic device, comprising:
a network interface card (NIC);
a power supply; and
a processor configured to:
control the NIC to communicate with an external server through a repeater based on TCP/IP session information, and
in response to receiving a turn-off command for the electronic device while the electronic device is turned-on, transfer the TCP/IP session information and additional information to the NIC, and be turned-off,
wherein the power supply is configured to supply power to the NIC while the processor is turned-off,
wherein the NIC is configured to periodically exchange a keep awake message with the external server through the repeater while the processor is turned-off based on the TCP/IP session information and the additional information sent from the processor to the NIC in response to the turn-off command to maintain a network session with the external server, and
wherein the additional information sent from the processor to the NIC in response to the turn-off command comprises at least one among symmetric key encryption, a message authentication code key and an initialization vector.

10. The electronic device as claimed in claim 1, wherein the NIC is configured to turn-on the electronic device in response to receiving a wake-on-LAN (WoL) signal.

11. The electronic device as claimed in claim 10, wherein when the NIC is further configured to receive an address resolution protocol (ARP) request message, and transmit an ARP response message including a media access control (MAC) address of the NIC in response to the ARP request message.

12. The electronic device as claimed in claim 1, wherein the NIC comprises at least one of an Ethernet module and a Wi-Fi module, and
the at least one of the Ethernet module and the Wi-Fi module is configured to perform a function of processing TCP segment generation, TCP ACK response, checksum verification, IP datagram generation, and ARP, by detecting a wake-on-LAN (WoL) signal.

13. The electronic device as claimed in claim 12, wherein the at least one of the Ethernet module and the Wi-Fi module is further configured to process at least one of a secure sockets layer (SSL) protocol and a transport layer security (TLS) protocol.

14. The electronic device as claimed in claim 1, wherein the NIC is further configured to receive and process the keep awake message, and in response to receiving the keep awake message, generate an ACK which is a TCP response and transmit the generated ACK.

15. The electronic device as claimed in claim 1, wherein the NIC is further configured to periodically exchange the keep awake message with the external server, and
a transmission period of the keep awake message is changed depending on a user setting.

16. The electronic device as claimed in claim 1, wherein the processor comprises at least one central processing unit (CPU).

17. The electronic device as claimed in claim 1, wherein the TCP/IP session information comprises a source port, a destination port, a sequence number, and an acknowledgement number.

18. The electronic device as claimed in claim 17, wherein the additional information is information required to maintain the network session with the external server.

19. The electronic device as claimed in claim 18, wherein the TCP/IP session information further comprises ping interval information.

20. A network system for controlling an electronic device, comprising: the electronic device comprising:
a processor configured to control the electronic device while the electronic device is turned-on and turn-off in response to a turn-off command; and
a network interface card (NIC) configured to periodically exchange a keep awake message with an external server through a repeater to maintain a network session with the external server; and
a repeater configured to store a network address conversion table and repeat communications between the electronic device and the external server to maintain a current address of the electronic device within the network address conversion table, wherein the repeater is further configured to transmit, in response to receiving a control signal directed to the electronic device from an external client through the external server, the control signal to the electronic device, wherein the processor is further configured control the NIC to communicate with the external server through the repeater based on TCP/IP session information, wherein the processor is further configured to, in response to receiving the turn-off command while the electronic device is turned-on, transfer the TCP/IP session information and additional information from the processor to the NIC, and be turned-off, wherein the NIC is further configured to periodically exchange the keep awake message with the external server through the repeater while the processor is turned-off based on the TCP/IP session information and the additional information sent from the processor to the NIC in response to the turn-off command to maintain the network session with the external server, wherein the TCP/IP session information comprises a source port, a destination port, a sequence number, and an acknowledgement number, and wherein the additional information sent from the processor to the NIC in response to the turn-off command comprises at least one among symmetric key encryption, a message authentication code key and an initialization vector.

* * * * *